United States Patent
Xu et al.

(10) Patent No.: US 12,488,563 B2
(45) Date of Patent: Dec. 2, 2025

(54) HUB IMAGE RETRIEVAL METHOD AND DEVICE

(71) Applicant: CITIC Dicastal CO., LTD, Qinhuangdao (CN)

(72) Inventors: Zuo Xu, Qinhuangdao (CN); Ning Wang, Qinhuangdao (CN); Tao Tian, Qinhuangdao (CN); Xi Li, Qinhuangdao (CN); Lihua Chen, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 496 days.

(21) Appl. No.: 17/897,121

(22) Filed: Aug. 26, 2022

(65) Prior Publication Data
US 2023/0060298 A1    Mar. 2, 2023

(30) Foreign Application Priority Data
Aug. 27, 2021   (CN) .................... 202110994884.7

(51) Int. Cl.
*G06V 10/74*    (2022.01)
*G06F 16/532*   (2019.01)
(Continued)

(52) U.S. Cl.
CPC .......... *G06V 10/761* (2022.01); *G06F 16/532* (2019.01); *G06T 7/62* (2017.01); *G06V 10/46* (2022.01); *G06T 2207/30242* (2013.01)

(58) Field of Classification Search
CPC .... G06V 10/761; G06V 10/46; G06V 10/443; G06F 16/532; G06F 16/538;
(Continued)

(56) References Cited

U.S. PATENT DOCUMENTS

| 11,087,450 B1 | 8/2021 | Bitton |
| 2017/0060904 A1* | 3/2017 | Pau ..................... G06F 16/5854 |
| 2020/0219265 A1 | 7/2020 | Shi et al. |

FOREIGN PATENT DOCUMENTS

| CN | 103279763 B | * | 3/2016 | |
| CN | 111522989 A | * | 8/2020 | ............. G06F 18/22 |

(Continued)

OTHER PUBLICATIONS

Espacenet English Translation of CN-103279763-B Description (Year: 2016).*

(Continued)

*Primary Examiner* — Sumati Lefkowitz
*Assistant Examiner* — Anthony J Rodriguez
(74) *Attorney, Agent, or Firm* — Yong Chen

(57) ABSTRACT

A hub image retrieval method and a device thereof for improving the retrieval accuracy of an image containing a hub. The method includes: performing feature extraction on a hub image to be processed containing a target hub, and obtaining a hub feature to be processed containing N sub-hub features, wherein the N sub-hub features at least include information characterizing the features of a hub window of the target hub; determining similarities between candidate hub features of each candidate hub image and the hub features to be processed; and selecting a candidate hub image matching the hub image to be processed from the plurality of candidate hub images based on the determined respective similarities.

16 Claims, 14 Drawing Sheets

(51) Int. Cl.
*G06T 7/62* (2017.01)
*G06V 10/46* (2022.01)
(58) Field of Classification Search
CPC ....... G06F 16/5854; G06T 2207/30164; G06T 7/62; G06T 2207/30242
See application file for complete search history.

(56) References Cited

FOREIGN PATENT DOCUMENTS

| | | | |
|---|---|---|---|
| CN | 113297411 A | | 8/2020 |
| CN | 109871854 A | | 8/2021 |
| KR | 20190016733 A | * | 2/2019 |

OTHER PUBLICATIONS

Espacenet English Translation of CN111522989A Description (Year: 2020).*
Extended European search report issued on European Patent App. No. 22192351.9.
Jie Gao, "The Research and Application of Wheel Recognition System Based on Image Recognition Technology", thesis for master's degree, Zhejiang University, May 2020.
Dian-fan Zhang et al., "Wheel Model Identification Based on Index Weight Vector of Aggregate Locally Descriptor Features", Acta Met R Ologica Sinica, vol. 40, No. 4, Jul. 2019.

* cited by examiner

HUB IMAGE RETRIEVAL METHOD AND DEVICE

TECHNICAL FIELD OF THE DISCLOSURE

The application relates to the field of information retrieval, in particular to a hub image retrieval method and device.

BACKGROUND OF THE DISCLOSURE

In the process of retrieving similar images for images in related technologies, usually after extracting the hash value of the image to be retrieved, retrieving an image similar to the image in an image library based on the extracted hash value. However, for a hub image containing a hub, when retrieving similar images only based on the hash value of hub images, the accuracy of retrieved similar images is low, which cannot meet the requirements of accurate push in hub image retrieval. Therefore, how to improve the accuracy of hub image retrieval is a problem worth considering.

SUMMARY OF THE DISCLOSURE

The embodiment of the application provides a hub image retrieval method and device, for the accuracy of image retrieval on the hub image.

A first aspect of the application provides a hub detection method, comprising:
performing feature extraction on a hub image to be processed containing a target hub, and obtaining a hub feature to be processed containing N sub-hub features, wherein the N sub-hub features at least include information representing the features of a hub window of the target hub, N is an integer greater than zero;
determining similarities between candidate hub features of each candidate hub image and the hub features to be processed;
selecting a candidate hub image matching the hub image to be processed from the plurality of candidate hub images based on the determined respective similarities.

In a second aspect of the application, a hub image retrieval device is provided, comprising:
a feature extraction unit, performing feature extraction on a hub image to be processed containing a target hub, and obtaining a hub feature to be processed containing N sub-hub features, wherein the N sub-hub features at least include information characterizing the features of a hub window of the target hub, Nis an integer greater than zero;
a similarity determination unit, determining similarities between candidate hub features of each candidate hub image in a plurality of candidate hub images and the hub features to be processed;
an image retrieval unit, selecting a candidate hub image matching the hub image to be processed from the plurality of candidate hub images based on the determined respective similarities.

A third aspect of the present application provides a computer device including a memory, a processor, and a computer program stored on the memory and operable on the processor, the processor implementing the method as described in the first aspect when executing the program.

A fourth aspect of the present application provides a computer-readable storage medium that stores computer instructions that, when run on a computer, cause the computer to perform the method as described in the first aspect.

The embodiments of the application adopt the above technical solutions, and can achieve at least the following technical effects:
In the process of image retrieval of hub images in the embodiments of the application, the sub-hub features characterizing the hub window features of the target hub are extracted, The candidate hub image is screened based on the similarity between the sub-hub feature of the target hub and the sub-hub feature corresponding to the candidate hub image, The hub window of hub in contained in the selected candidate hub image has high similarity with the hub window of the target hub, thus improving the accuracy of image retrieval of the hub image.

DETAILED DESCRIPTION OF THE EMBODIMENTS

Figure 1:
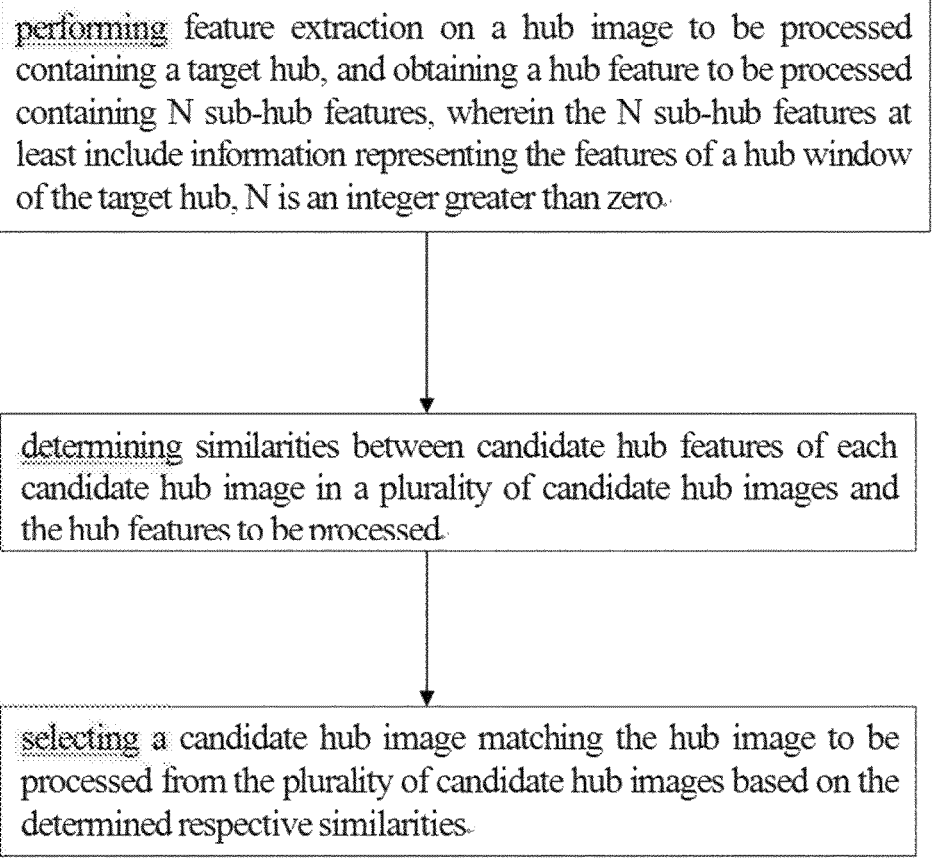
FIG. 1 is a flowchart of a hub image retrieval provided by an embodiment of the present application.

In order to facilitate a person skilled in the art to better understand the technical solutions of the present application, the technical terms related to the present application will be explained below.

1) Hubs, Target Hubs, and Candidate Hubs:

Hub is the rotating part of the wheel core connected by the inner profile wheel steel of the tire through the upright post, that is, the metal part that supports the center of the tire and is installed on the shaft. Hub can also be called rim, steel ring, wheel and tire bell and so on. There are various kinds of hub according to different types of radius, width, forming method and materials; the target hub is a hub contained in a hub image that needs image retrieval; the candidate hub is a hub included in the candidate hub image.

2) a Candidate Hub Image and a Hub Image to be Processed:

The hub image to be processed in the embodiment of the application is a hub image requiring image retrieval, and the hub image to be processed in the embodiment of the application may include various kinds of hub; the candidate hub image is the hub image existed in the hub image library.

The candidate hub image is a hub image used for image retrieval of the hub image to be processed.

The main design ideas of the embodiments of the present application are described below:

In the embodiment of the application, in the process of retrieving the hub image to be processed including the target hub, feature extraction on the hub image to be processed can first carried out to obtain the hub feature to be processed including at least the feature of the hub window characterizing the target hub; then, based on the similarity between the candidate hub features of each candidate hub image and the hub features to be processed, selecting a candidate hub image matching the hub image to be processed from each candidate hub image;

As an embodiment, the selected candidate hub image may be the candidate hub image most similar to the hub image to be processed, and the selected candidate hub image may be the candidate hub image which is more similar to the hub image to be processed or whose similarity degree satisfies certain conditions; the selected candidate hub images can be one or a plurality, and the technical personnel in the art can set the conditions and number of selecting the candidate hub images according to the actual requirements.

It should be explained that in the embodiment of the present application, the feature extraction on the hub image to be processed to obtain the wheel feature to be processed and the feature extraction of each candidate hub image to obtain the candidate hub feature should be consistent; the disclosure can, but is not limited to, carry out feature extraction on each candidate hub image before the hub image retrieval of the image to be processed, and store the extracted feature of each candidate hub and the corresponding candidate hub image into an image database after being associated, so as to be ready for inquiry when carrying out the hub image retrieval of the image to be processed.

The hub image retrieval method provided by the embodiment of the present application is described in detail below, with reference to FIG. 1, and specifically comprises the following steps:

Step S101, performing feature extraction on a hub image to be processed containing a target hub, and obtaining a hub feature to be processed containing N sub-hub features, wherein the N sub-hub features at least include information characterizing the features of a hub window of the target hub, N is an integer greater than zero.

It should be noted that, in the embodiment of the application, at least one sub-hub feature of the N sub-hub features is determined based on the feature of the hub window of the target hub, however the specific value of the N is not limited in the embodiment of the application, and the technical personnel in the art can set the specific value of the N and the N sub-hub features according to the actual requirements.

Figure 2:
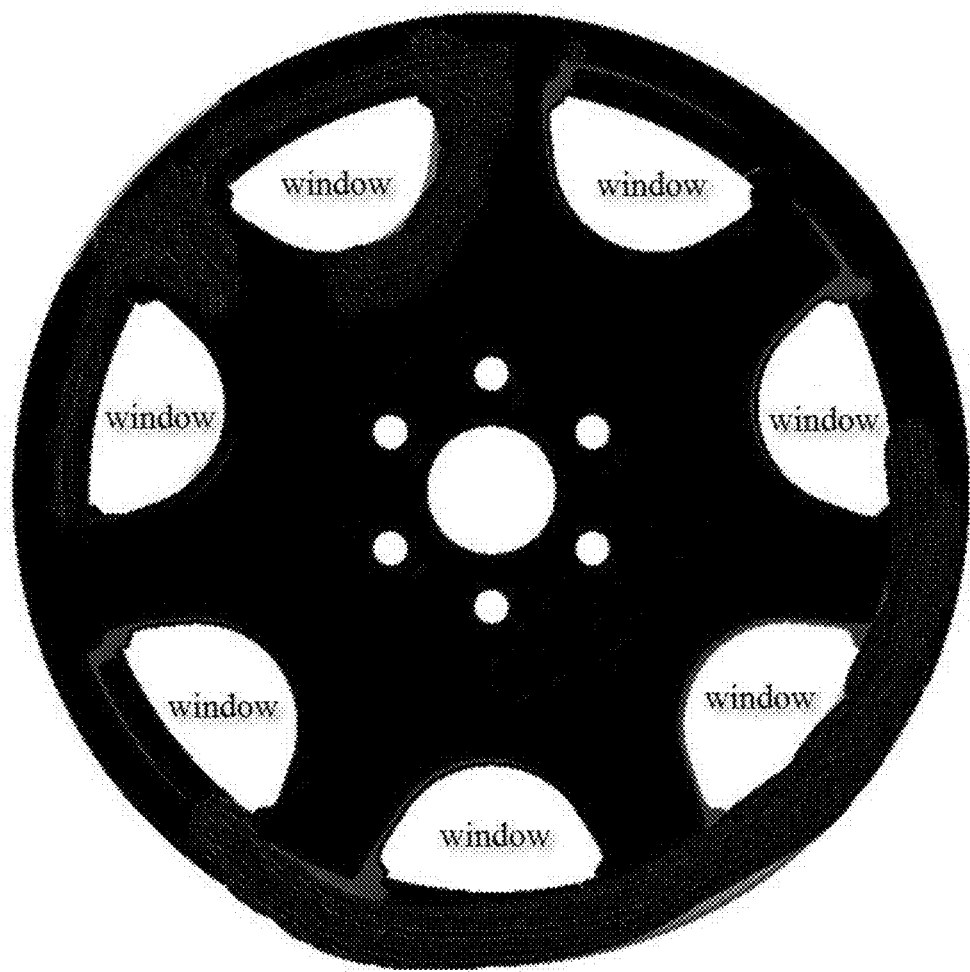
FIG. 2 is a schematic diagram of a hub provided by an embodiment of the present application.

For ease of understanding, the hub window of a hub (which may, but is not limited to, include the above-mentioned target hub) is explained here. See FIG. 2, which is a schematic diagram of a hub, the "window" marked in the figure is the hub window of the hub, and the hub illustrated in the figure contains seven hub windows; however, the number of hub windows included in each hub is not limited in the embodiment of the present application.

Step S102, determining similarities between candidate hub features of each candidate hub image in a plurality of candidate hub images and the hub features to be processed.

It should be noted that the plurality of candidate hub images in step S102 can be all of the candidate hub images in the image database, and the plurality of candidate hub images in step S102 can also be part of the candidate hub images in the image database, which can be set according to actual requirements by the skilled in the art.

As one embodiment, in step S102, respectively for the features of each candidate hub used as the current candidate hub features, a similarity determination operation is performed to determine a similarity between a candidate hub feature of each candidate hub image and the hub feature to be processed based on a sub-similarity of a candidate hub feature of each candidate hub image and a corresponding sub-hub feature of the hub feature to be processed, the specific method of which will be further described below.

Step S103, selecting a candidate hub image matching the hub image to be processed from the plurality of candidate hub images based on the determined respective similarities.

In one embodiment, in step S103, a similarity degree greater than a second similarity threshold among the respective similarities can be determined as a target similarity, and a candidate hub image corresponding to the target similarity can be determined as a candidate hub image matching the hub image to be processed.

As an embodiment, in step S103, the largest similarity among the respective similarities can be determined as the target similarity, and then the candidate hub image corresponding to the target similarity can be determined as the candidate hub image matching the hub image to be processed.

It should be explained that the embodiment of the present application can also set a specific way of selecting a candidate hub image matching the hub image to be processed from the plurality of candidate hub images based on the determined similarity on the basis of the actual requirements, for example, it can but not limited to arranging the determined similarities in order from large to small, a candidate hub image corresponding to a similarity ordered in a specified order is determined as a candidate hub image matching the hub image to be processed, for example, a candidate hub image corresponding to a maximum first 3 or 10 similarities is determined as a candidate hub image matching the hub image to be processed.

In the following description of the embodiment of the present application, the specific embodiments of the above steps S101 to S103 will be further described.

As an embodiment, in order to improve the efficiency and accuracy of feature extraction of the hub image to be processed, the hub image to be processed can also be preprocessed before step S101; the preprocessing method may, but is not limited to, include image grayscale processing and image binarization processing for the hub image to be processed.

Figure 3:
FIG. 3 is a schematic diagram of an image after image gray processing provided by the embodiment of the present application.

As one embodiment, the following provides a process of image grayscale processing and image binarization processing in preprocessing a hub image to be processed:

In the process of image grayscale processing, every pixel in the pixel matrix can satisfy the following relationship: R=G=B, and this value at this time is called gray value; in the image grayscale processing, the pixel color before grayscale is set to (R0, G0, B0) and the pixel color after grayscale is set to (R1, G1, B1). Then, the calculation method of the color value of the grayscale pixel is as follows: Formula (1a), Formula (1b) and Formula (1c). Referring to FIG. 3, an exemplary diagram of the image obtained after image grayscale processing of the hub image to be processed is provided.

$$R1=R0\times\alpha+G0\times\beta+B0\times\gamma \quad \text{Formula (1a)}$$

$$G1=R0\times x+G0\times\beta+B0\times\gamma \quad \text{Formula (1b)}$$

$$B1=R0\times\alpha+G0\times\beta+B0\times\gamma \quad \text{Formula (1c)}$$

In the above formulas (1a), (1b) and (1c), $\alpha$, $\beta$ and $\gamma$ are the weights of R, G and B in the pixel points, respectively, one skilled in the art can set them according to actual needs, such as setting $\alpha$, $\beta$ and $\gamma$ to satisfy "$\alpha+\beta+\gamma=1$", further, it can but not limited to set $\alpha$, $\beta$ and $\gamma$ to 0.3, 0.59 and 0.11, respectively; embodiments of the present application do not limit the specific values of $\alpha$, $\beta$ and $\gamma$.

In the process of image binarization, the gray value of each pixel point in the pixel point matrix of the image can be 0 (black) or 255 (white), that is, the whole image is only black and white, and the gray value range in the image after image gray processing is 0 to 255, and the gray value range in the image after image binarization processing is 0 or 255.

Figure 4:
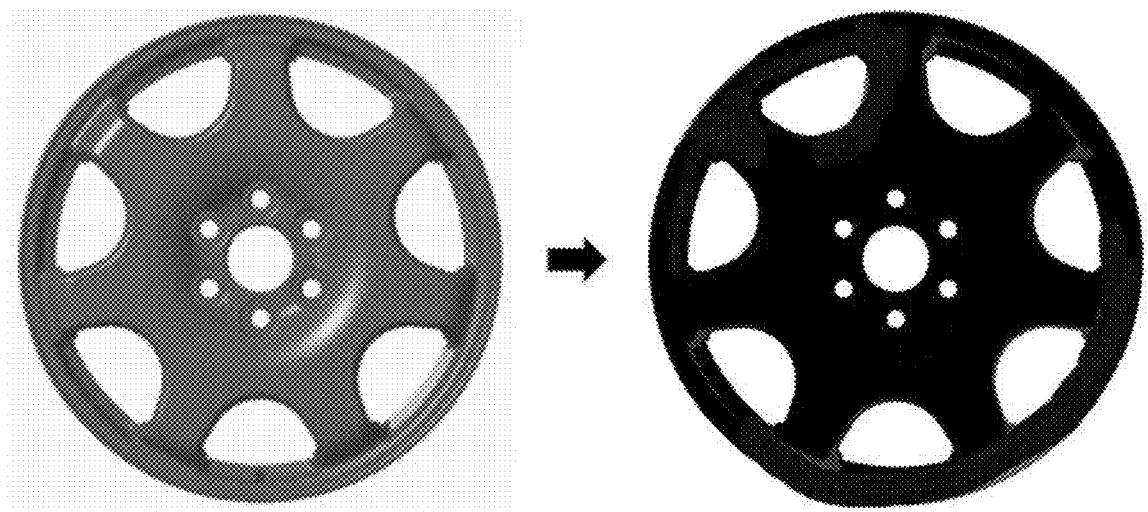
FIG. 4 is a comparison schematic diagram of images before and after image binarization processing provided by the embodiment of the present application.

The value of RGB in the black pixel in the image is "R=0, G=0, B=0"; the value of RGB in the white pixel in the image is "R=255, G=255, B=255";

In the process of image binarization, histogram method (also known as bimodal method) can also be used to find binarization threshold. According to histogram method, the image is composed of foreground and background. In the histogram after image gray processing, both foreground and background form peaks, and the lowest valley between the two peaks is the threshold. After taking the threshold, compare the current pixel color values one by one. Referring to FIG. 4, a contrast diagram of an image after carrying out image binarization processing on the original image is provided.

Figure 5:
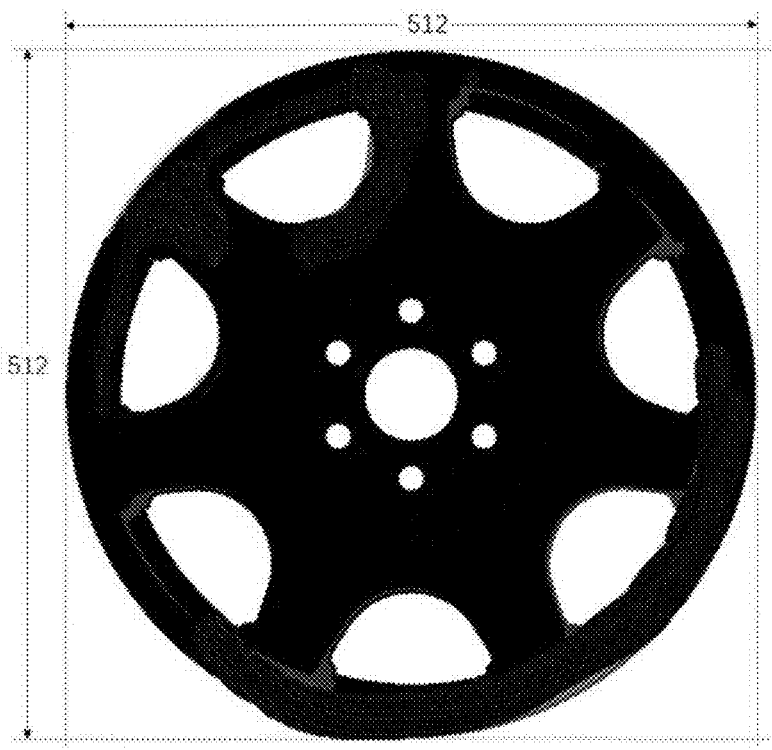
FIG. 5 is an exemplary diagram of an image normalization process provided by an embodiment of the present application.

As an embodiment, in the embodiment of the present application, the image of the hub to be processed after preprocessing can also be normalized, such as adjusting the size of the image of the hub to be processed to a preset resolution, but not limited to it; the preset resolution is not limited and can be set according to actual requirements by a person skilled in the art, such as, but not limited to, setting the preset resolution to 512×512 or 1024×512, etc. Referring to FIG. 5, an exemplary diagram of normalizing an image is provided.

Figure 6:
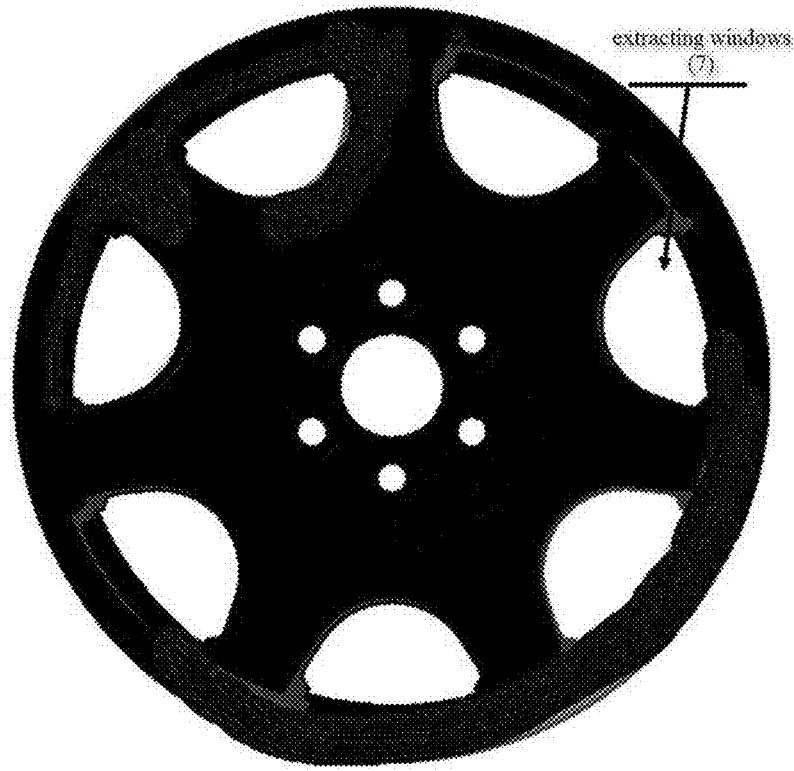
FIG. 6 is a schematic diagram of the number of hub windows provided by an embodiment of the present application.

As an embodiment, in order to further improve the accuracy of image retrieval for hub images in the embodiment of the present application, the N sub-hub features in the embodiment of the present application may, but are not limited to, include at least one of the following first sub-hub features and second sub-hub features; wherein, the first sub-hub feature may be a feature characterizing the number of hub windows of the target hub in the hub image to be processed, i.e. the number of hub windows of the target hub may, but is not limited to, be used as the first sub-hub feature in the embodiment of the present application; referring here to FIG. 6, the white area (i.e. window) farther from the inner ring is extracted and the number of hub windows is calculated (the number of hub windows illustrated in the figure is 7).

the second sub-hub feature may be a feature characterizing the shape of a hub window of the target hub in the hub image to be processed, for example, the second sub-hub feature may be relevant information of a hub window array of each hub window in the target hub in the embodiment of the present application, etc.

As an embodiment, in order to further improve the accuracy of image retrieval for the hub image, the N sub-hub features in the embodiment of the present application also include at least one of the following third sub-hub features and fourth sub-hub features; wherein, the third sub-hub feature may be a feature characterizing hub size information of the target hub in the hub image to be processed; the fourth sub-hub feature may be a fourth sub-hub feature characterizing information of the number of bolt holes in the target hub in the hub image to be processed.

Figure 7:
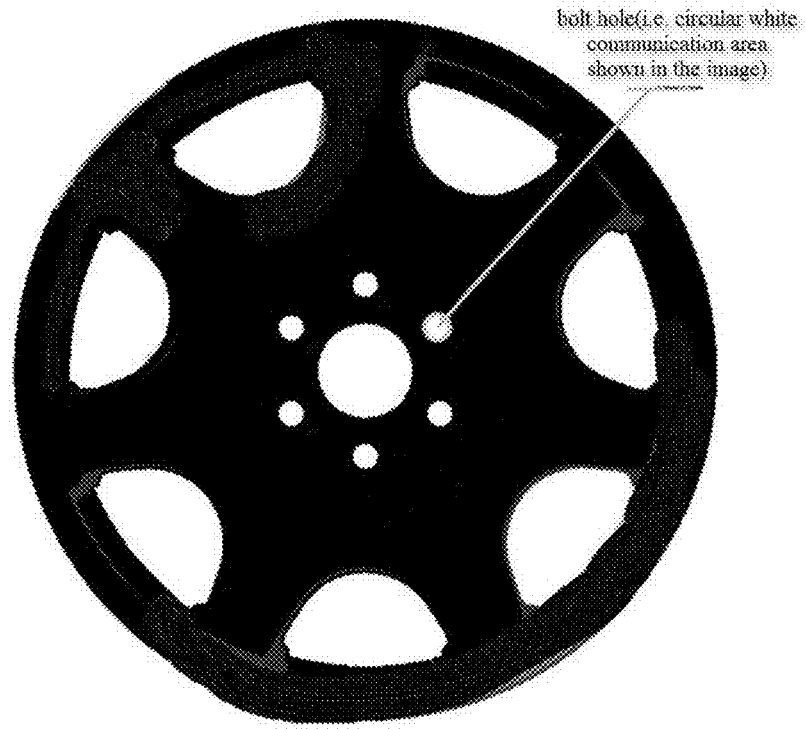
FIG. 7 is an exemplary diagram of a bolt hole on a hub provided by an embodiment of the present application.

For ease of understanding, FIG. 7 of the embodiment of the present application provides a schematic diagram of a bolt hole in a hub, which illustrates that the hub includes six bolt holes, however the number of bolt holes in each hub is not limited in the embodiment of the application, and can be determined according to the actual type of the hub.

That is, the N sub-hub features in the embodiment of the present application may only include the first sub-hub features or the second sub-hub features; the N sub-hub feature may also include at least one of the third sub-hub feature and the fourth sub-hub feature in the case of including at least one of the first sub-hub feature and the second sub-hub feature.

In one embodiment, when the N sub-hub features of the hub feature to be processed include the third sub-hub feature, the center point of the target hub in the image to be processed can also be determined in the process of obtaining the hub feature to be processed in step S101; extracting the outer radius and inner radius of the target hub based on the center point of the target hub; based on the outer radius and the inner radius, the third sub-hub feature is determined.

Figure 8:
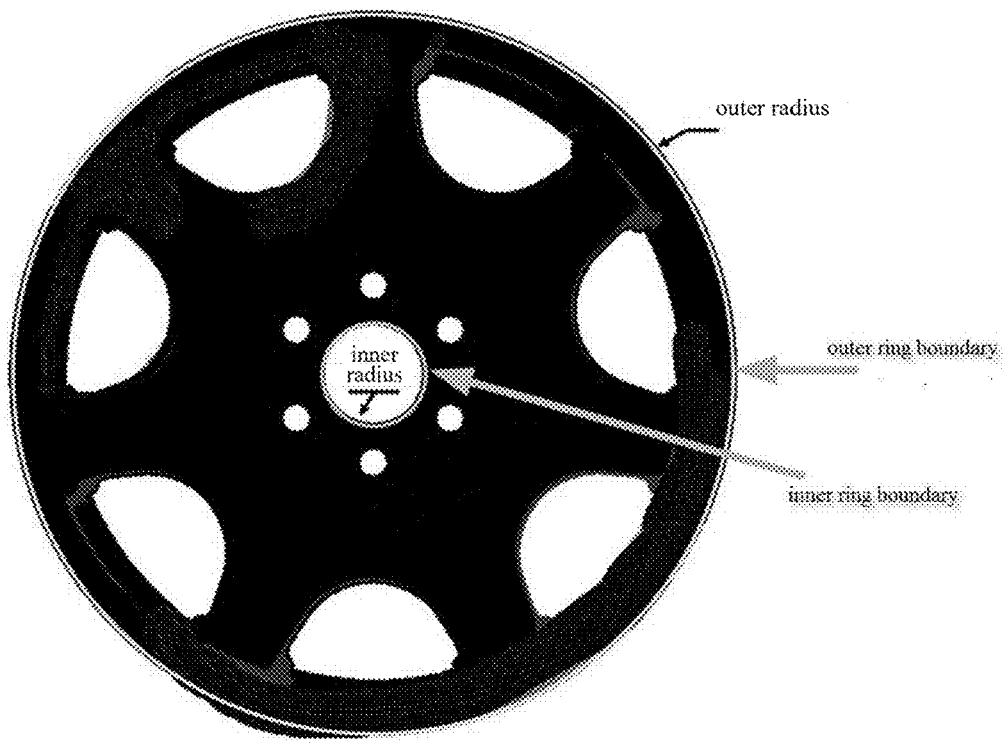
FIG. 8 is an exemplary diagram of an inner ring boundary and an outer ring boundary of a hub provided by an embodiment of the present application.

Further, in step S101 of the embodiment of the present application, the center of the inner ring boundary of the target hub in the hub image to be processed may also be determined as the center point of the target hub, the distance between the inner ring boundary and the center point of the target hub may be determined as the above-mentioned inner radius, and the distance between the outer ring boundary of the target hub and the center point of the target hub may be determined as the above-mentioned outer radius. Referring to FIG. 8 herein, an exemplary diagram of the inner ring boundary and the outer ring boundary of a hub is provided.

Further, in embodiments of the present application, the ratio of the outer radius to the inner radius may be determined as a third sub-hub feature, the ratio of the inner radius to the outer radius may also be determined as a third sub-hub feature, and the difference between the outer radius and the inner radius may be determined as a third sub-hub feature too.

Figure 9:
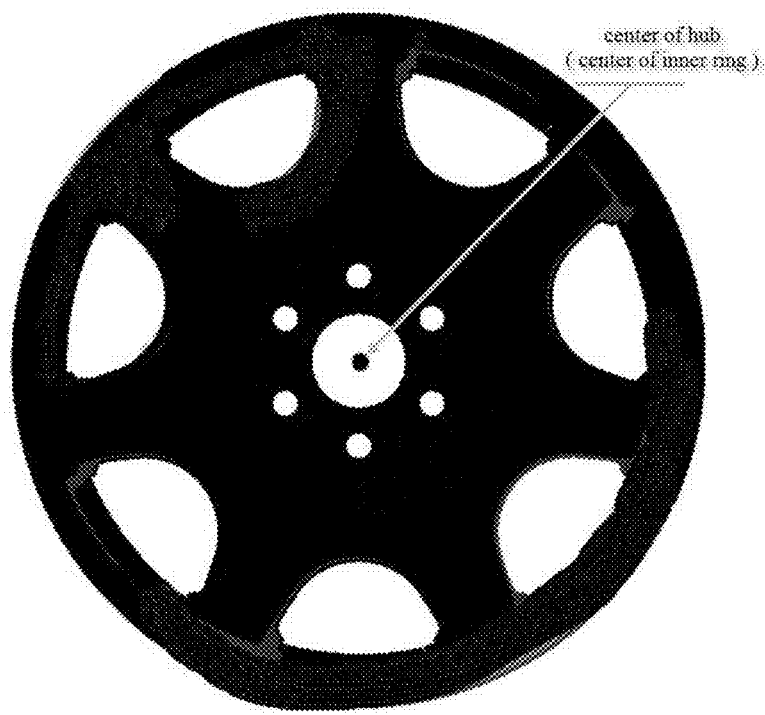
FIG. 9 is an exemplary diagram of extracting a center point of a target hub provided by an embodiment of the present application.

For ease of understanding, embodiments of the present application provide an exemplary process for extracting a center point of a target hub and an outer radius and an inner radius of the target hub:

1) Extracting the center point of the target hub as the center of the inner ring;

Referring to FIG. 9, the position of the black pixel point in the hub image to be processed is extracted, and the boundary position of the top, right, down and left of the extracted pixel point in the whole image is calculated, so that x and y in the center point position coordinates (x, y) satisfy the relationship of formula (2a) and formula (2b), respectively:

$$x=(\text{top}+\text{down})/2 \qquad \text{Formula (2a)};$$

$$y=(\text{left}+\text{right})/2 \qquad \text{Formula (2b)};$$

2) Extracting the outer radius R and the inner radius r of the target hub;

According to the calculated boundary positions of top, right, down, left, the width and height values of the black pixel area are calculated based on the following formulas (3a) and (3b):

$$\text{width}=\text{right}-\text{left} \qquad \text{Formula (3a)};$$

$$\text{height}=\text{down}-\text{top} \qquad \text{Formula (3b)};$$

Then the outer radius R of the target hub satisfies formula (4):

$$R=(\text{width}+\text{height})/4 \qquad \text{Formula (4)}$$

Figure 10:
FIG. 10 is an exemplary diagram of an outer radius and an inner radius of a hub provided by an embodiment of the present application.

The collection of black pixels is extracted, and the distance from each black pixel to the center point is measured, and then sorted from small to large. Finally, the black pixel with the smallest distance from the center point is obtained, and the distance is the inner radius r value of the hub. Referring FIG. 10, a schematic diagram of the outer radius R and inner radius r of a target hub is provided.

Figure 11:
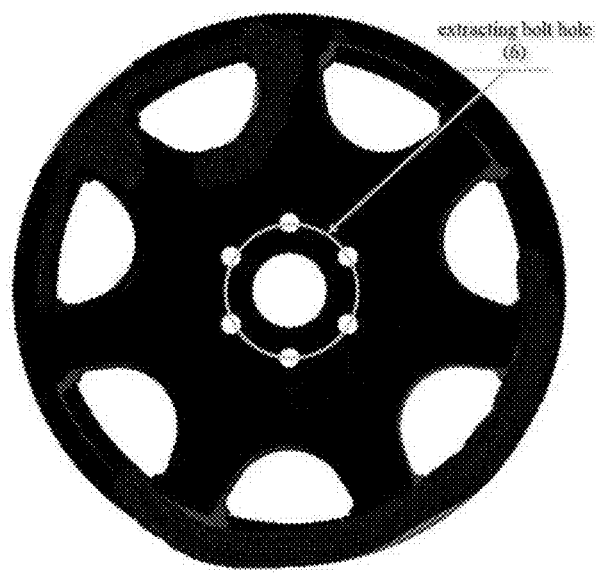
FIG. 11 is an exemplary diagram of the number of bolt holes on a hub provided by an embodiment of the present application.

As one embodiment, when the N sub-hub features include the fourth sub-hub features, in the process of acquiring the hub feature to be processed in step S101, a circular white communication area closest to the inner ring boundary in the hub image to be processed may also be extracted, and the number of the extracted circular white communication areas may be determined as the fourth sub-hub feature, wherein, a circular white communication area is an area corresponding to a bolt hole; here, referring to the schematic diagram in FIG. 11, the circular white area closest to the inner ring (i.e., bolt holes) is extracted and the number of bolt holes are calculated.

As an embodiment, when the N sub-hub features of the hub feature to be processed include the second sub-hub feature, in the process of obtaining the hub feature to be processed in step S101, the first hash of each hub window of the target hub in the hub image to be processed may also be extracted; a hub window array of the target hub is determined based on each extracted first hash; a second hash of the hub window array is determined as the second sub-hub feature; wherein the determined hub window array includes a single window array or a multi-window array.

Figure 12:
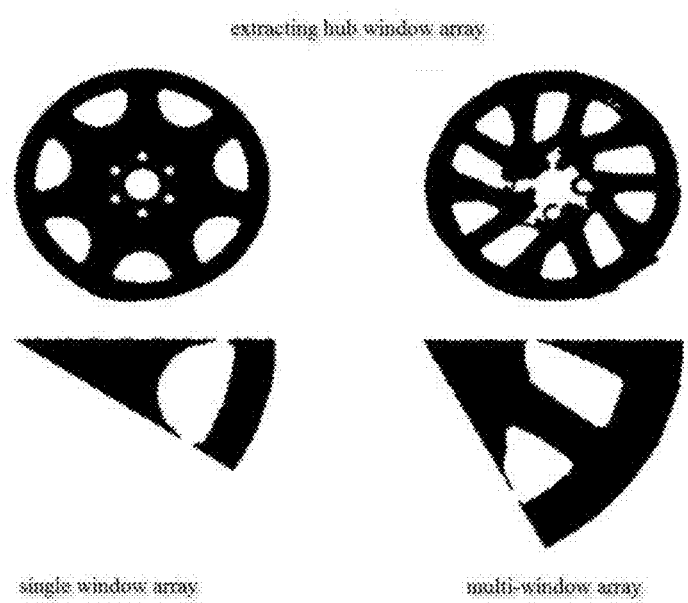
FIG. 12 is a schematic diagram of a hub window array provided by an embodiment of the present application.

In particular, in an embodiment of the present application, firstly, a first hash of each hub window in a hub image to be processed is extracted, in the process of extracting the first hash of each hub window, all hub windows may be transferred to the same position, and the hash of each hub window is calculated as the first hash of each hub window at the same position by using a hash algorithm; then comparison of the first hash of each hub window is performed, the hub window array is calculated, and then the hash of the hub window array is calculated as the second hash by using a hash algorithm; wherein, if the first hash of each hub window is the same, the hub window array of the target hub is a single window array; if the first hash of each hub window is different, the hub window array of the target hub is a multi-window array (the single window array and the multi-window array shown in FIG. 12).

Figure 13:
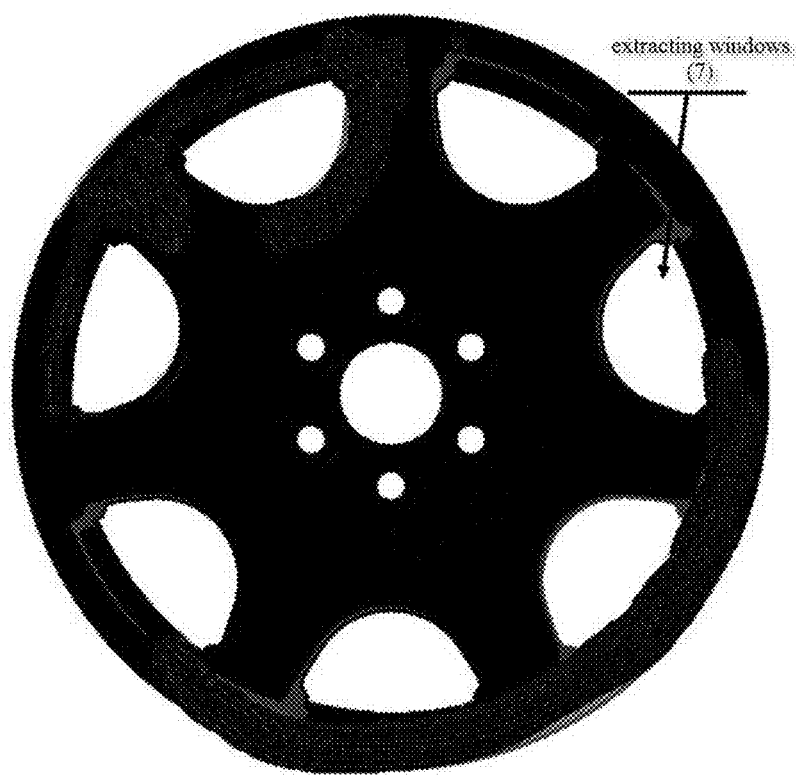
FIG. 13 is an exemplary diagram of a white communication area in a hub provided by an embodiment of the present application.

For ease of understanding, a specific example of determining the features of the second sub-hub described above is provided below:

performing binarization processing on the hub image to be processed, obtaining pixel points of all white communication areas in the hub image to be processed after binarization processing, and grouping according to the positions of the obtained pixel points. Reference can be made here to FIG. 13, where the pixel points of the target hub in FIG. 13 can be divided into 15 groups; secondly, the distance L from the pixel point in the white communication area to the center point of the target hub is calculated;

if the distance L from a pixel point to the center point of the target hub satisfies "L>R" (R is the outer radius of the target hub), the pixel point is ignored; if the distance L from a pixel point to the center point of the target hub satisfies "L<r" (r is the inner radius of the target hub), the pixel point is the pixel point within the inner ring boundary of the target hub, and the pixel point is ignored; if the distance L from a pixel point to the center point of the target hub satisfies "r<L<R/3", the pixel point is determined to be a pixel point in the area corresponding to the bolt hole; if the distance L from a pixel point to the center point of the target hub satisfies "R/2<L≤R", the pixel point is determined to be the pixel point of the hub window.

Figure 14:
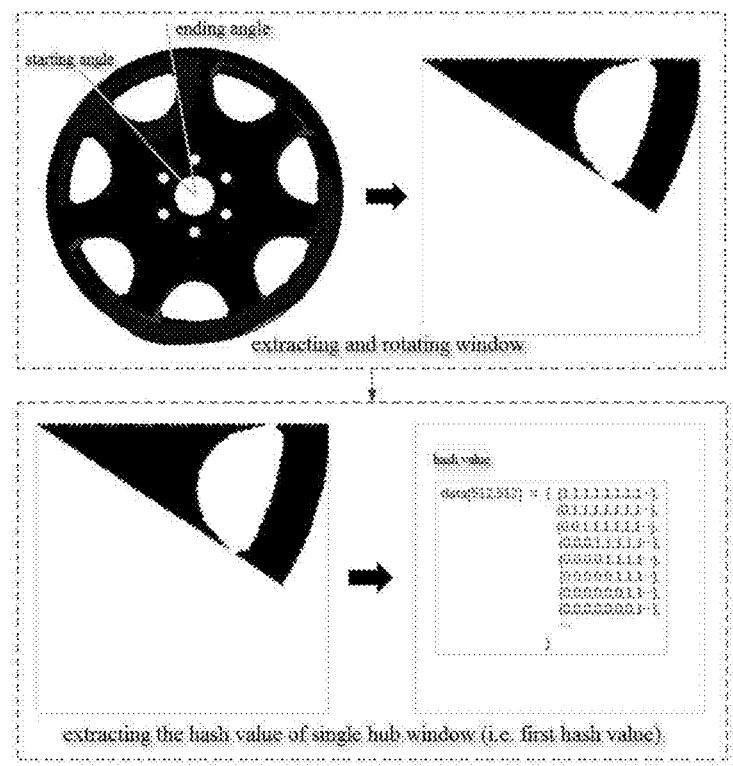
FIG. 14 is an exemplary diagram of an area for extracting a hub window provided by an embodiment of the present application.

Referring to FIG. 14, the areas of seven hub windows can be obtained by the above way, and the area of the first hub window is selected, and all white pixels in the area of the hub window are represented by black pixels instead, and the starting angle and ending angle are calculated; then, the sector area where the hub window is located is calculated according to the starting angle and the ending angle; finally, all pixel points in the sector area are rotated to the X-axis forward direction, and the starting position coincides with the X-axis, and the area map of the hub window is automatically generated. Finally, the area map is generated as a hash array of the hub window (i.e., the first hash of the hub window), and the hash array is 512×512 pixel point.

Figure 15:
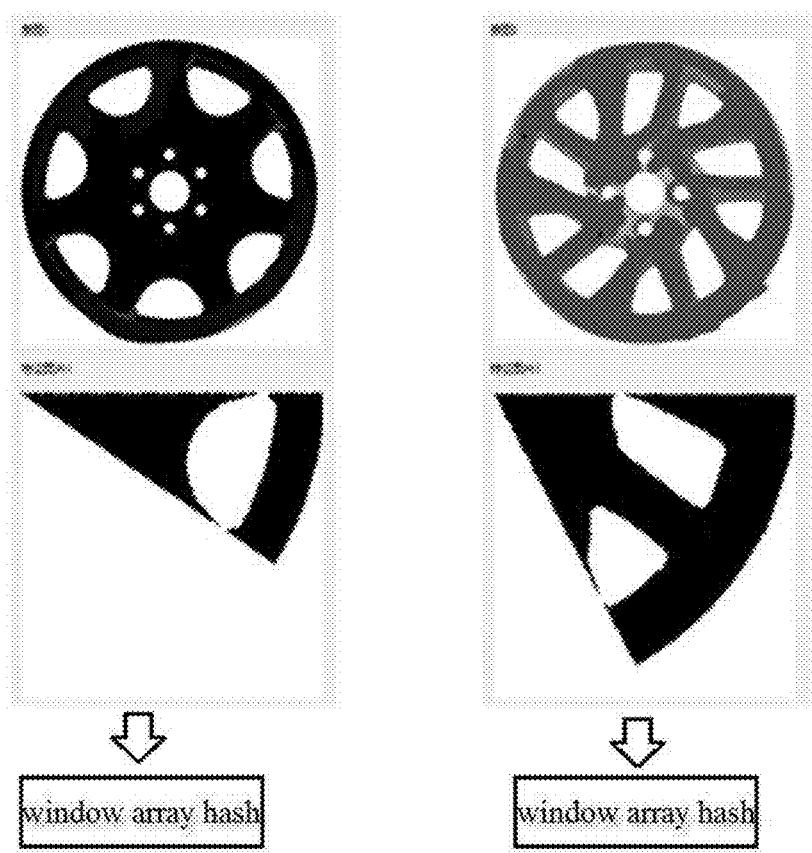
FIG. 15 is an exemplary diagram of a window array hash provided by an embodiment of the present application.

It should be noted that each hash (also referred to as a hash value) referred to in the embodiment of the present application may be essentially a two-dimensional array, and reference can be made here to FIGS. 14 and 15, in which the image points of the white communication area in the hub have a value of 1 at the corresponding position in the two-dimensional array, and the pixels of the black communication area have a value of 0 at the corresponding position in the two-dimensional array; thus, the hash value of the window in FIG. 15 (i.e. the window array hash illustrated in the figure) is a two-dimensional array of A[512, 512] denoted by 0 and 1.

Figure 16:
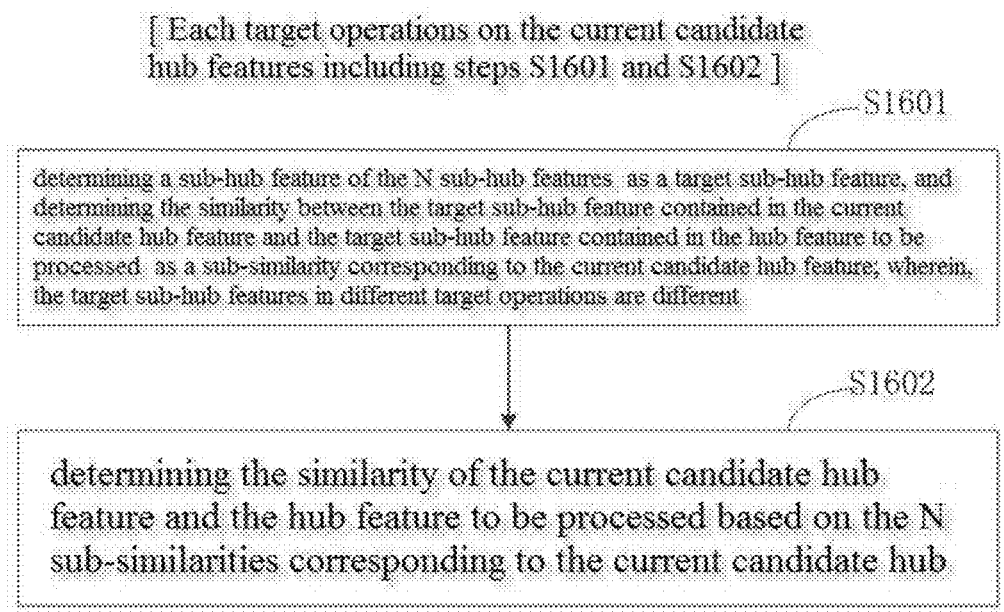
FIG. 16 is a flowchart of a target operation provided by an embodiment of the present application.

In the following contents of the embodiment of the present application, the method for determining the similarity between the candidate hub feature of each candidate hub image and the hub feature to be processed in step S102 is further described:

As an embodiment, in step S102, a similarity determination operation may be performed taking each of the candidate hub features as a current candidate hub feature; wherein, N target operations can be respectively performed for the current candidate hub features to determine N sub-similarities corresponding to the current candidate hub features;

As an embodiment, referring to FIG. 16, embodiments of the present application provide a specific example of the above-mentioned target operation, one of which may, but is not limited to, include steps S1601 and S1602 illustrated in the figure.

In step S1601, a sub-hub feature of the N sub-hub features is determined as a target sub-hub feature, and the similarity between the target sub-hub feature contained in the current candidate hub feature and the target sub-hub feature contained in the hub feature to be processed is determined as a sub-similarity corresponding to the current candidate hub feature; wherein, the target sub-hub features in different target operations are different.

In step S1602, based on the N sub-similarities corresponding to the current candidate hub features, the similarity of the current candidate hub feature and the hub feature to be processed is determined.

As an embodiment, in the step S1602, the N sub-similarities can be weighted and summed according to the respective weights of the N sub-hub features to obtain the similarity of the current candidate hub features and the hub features to be processed.

The setting mode of weights corresponding to the N sub-hub features is not limited, a person skilled in the art may set them according to actual requirements, for example, the sum of the respective weights of the N sub-hub features may be set to 1 or other values, see formula (5a) and formula (5b), where a calculation formula for determining the similarity between the current candidate hub feature and the hub feature to be processed is provided:

$$S1 = \Sigma_{m=1}^{N}(Pm \times Km) \quad \text{Formula (5a)}$$

$$1 = \Sigma_{m=1}^{N} Km \quad \text{Formula (5b)}$$

wherein, in formula (5a) and formula (5b), m is the identification of sub-hub features among N sub-hub features, and Km is the weight corresponding to the sub-hub features identified as m; Pm is the sub-similarity corresponding to the sub-hub feature identified as m in the current candidate hub feature; S1 is the similarity between the candidate hub feature and the hub feature to be processed.

As an embodiment, in the step S1602, the number of sub-similarities larger than the corresponding first similarity threshold among the N sub-similarities may be determined as the similarity between the current candidate hub feature and the hub feature to be processed.

As an embodiment, in the embodiment of the present application, images containing various types of hubs may be pre-acquired as candidate hub images, and the acquired candidate hub images and candidate hub features of each candidate hub image may be stored into a preset image database.

In order to further improve the flexibility of combination of hub image retrieval and practice, when N is an integer greater than 1 in the embodiment of the present application, different priorities may also be set for the N sub-hub features based on actual requirements. Further, prior to step S102, part of the standby candidate hub images may be screened out from the image database based on the basic sub-hub features whose priority satisfies the priority condition, and then in step S102, the similarity between the candidate hub features of each candidate hub image in the partial candidate hub image and the hub features to be processed is determined; wherein:

the basic sub-hub feature may be based on the priority of different sub-hub features, and at least one sub-hub feature is selected from N sub-hub features contained in the hub feature to be processed; if the N sub-hub features include a first sub-hub feature Q1, a second sub-hub feature Q2, a third sub-hub feature Q4 and a fourth sub-hub feature Q4, and the order of priority from high to low is Q3, Q1, Q2 and Q4, then Q3 can be determined as the basic sub-hub feature, and candidate hub images whose similarity between Q3 of candidate hub images and Q3 of hub features to be processed is greater than a similarity threshold are screened out from the image database.

Several specific examples of determining the similarity between the current candidate hub features and the hub features to be processed are provided below:

Example 1

Selecting all the above conditions and carrying out similarity comparison, firstly inputting a hub image to be processed including a target hub, extracting the outer radius and the inner radius of the target hub in the hub image to be processed, and determining the ratio of the extracted inner radius and the outer radius as the third sub-hub feature (i.e. the ratio of the inner radius and the outer radius); extracting the number of bolt holes of the target hub as the fourth sub-hub feature (i.e. the number of bolt holes) and extracting the number of hub windows of the target hub as the first sub-hub feature (i.e. the number of windows); And extracting the hash of the hub window of the target hub as the second sub-hub feature, and further executing the following process:

taking the first sub-hub feature, the third sub-hub feature and the fourth sub-hub feature as the basic sub-hub feature in the retrieval, and initially screening out candidate hub images which are similar to the hub images to be processed from the image database based on the basic sub-hub feature; further based on the comparison between the second sub-hub feature of the hub image to be processed and the second sub-hub feature corresponding to each candidate hub image screened out, i.e. comparing a hash value representing a hub window shape of a target hub in a hub image to be processed (i.e., a second sub-hub feature) with a hash value characterizing a hub window shape corresponding to each candidate hub image initially screened out, thereby determining the similarity between each candidate hub image screened out and the hub image to be processed; wherein the similarity satisfies the following formula (6)

$$Si = P2_i \quad \text{Formula (6)}$$

wherein, in formula (6), i is the identification of each candidate hub image preliminarily screened out; Si is the similarity between the candidate hub image identified as i and the hub image to be processed; $P2_i$ is a sub-similarity between the second sub-hub feature of the candidate hub image identified as i and the second sub-hub feature of the hub image to be processed.

Further, in this example, based on the determined similarities, the candidate hub images are screened again from the preliminary screened candidate hub images, and the candidate hub images matching the hub images to be processed are selected.

Figure 17:
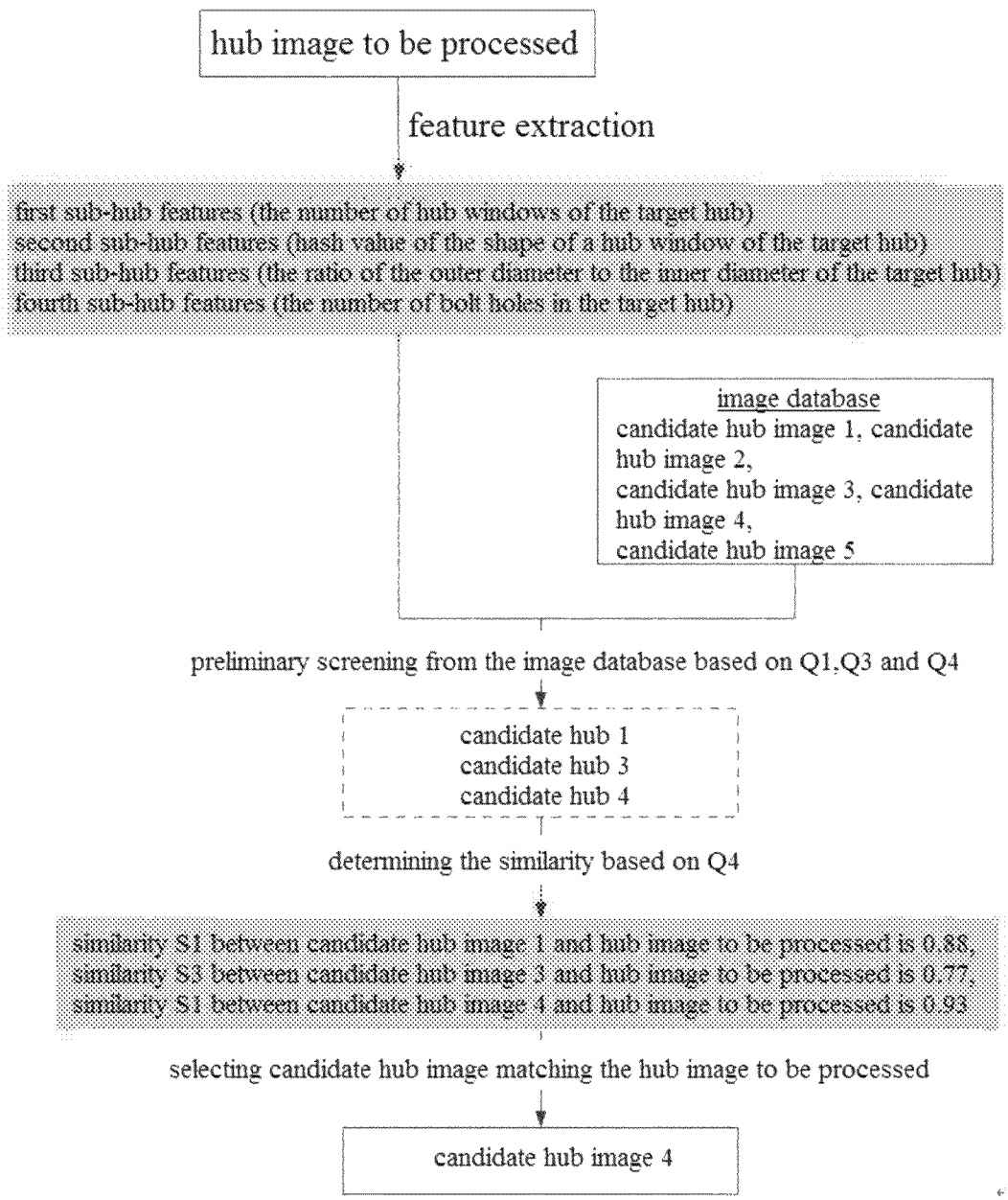
FIG. 17 is an exemplary flowchart of a hub image retrieval provided by the embodiment of the present application.

Referring to FIG. 17, an exemplary diagram of the above-mentioned screening process is provided, in which it is assumed that the image database contains candidate hub images 1 to 5; in this example, the first sub-hub feature, the second sub-hub feature, the third sub-hub feature and the fourth sub-hub feature are respectively extracted for the candidate hub images 1 to 5 in advance and stored in the image database as respective corresponding candidate hub images; furthermore, in this example, the first sub-hub feature Q1, the second sub-hub feature Q2, the third sub-hub feature Q3 and the fourth sub-hub feature Q4 may be extracted for the hub image to be processed, and then preliminary screening is carried out from the image database based on Q1, Q3 and Q4 to screen out the candidate hub image 1, the candidate hub image 3 and the candidate hub image 4; and then determining the similarity based on Q4. Here, as shown in the figure, the similarity S1 between the candidate hub image 1 and the hub image to be processed is 0.88, the similarity S3 between the candidate hub image 3 and the hub image to be processed is 0.77, and the similarity S4 between the candidate hub image 4 and the hub image to be processed is 0.93, then it may select, but not limited to, the candidate hub image 4 as a candidate hub image matching the hub image to be processed without limitation.

Example 2

Referring to Example 1 above, the following procedure is performed after extracting the first sub-hub feature to the fourth sub-hub feature of the hub image to be processed:

taking the fourth sub-hub feature as the basic sub-hub feature in the retrieval, a candidate hub image similar to the hub image to be processed is preliminarily screened out from the image database; further based on the third sub-hub feature, the first sub-hub feature and the second sub-hub feature of the hub image to be processed, determining the similarity of each candidate hub image preliminarily screened out and the hub image to be processed; wherein the above similarity in this example satisfies the following formula (7);

$$Si = k1 \times P3_i + k2 \times P1_i + (1-k1-k2) \times P2_i \quad \text{Formula (7)}$$

wherein, in formula (7), i is the identification of each candidate hub image screened for the first time; Si is the similarity between the candidate hub image identified as i and the hub image to be processed; $P3_i$ is a sub-similarity between the third sub-hub feature of the candidate hub image identified as i and the third sub-hub feature of the hub image to be processed; $P1_i$ is a sub-similarity between the first sub-hub feature of the candidate hub image identified as i and the first sub-hub feature of the hub image to be processed; $P2_i$ is a sub-similarity between the second sub-hub feature of the candidate hub image identified as i and the second sub-hub feature of the hub image to be processed; k1, k2 and (1−k1−k2) are weights corresponding to the third sub-hub feature, the first sub-hub feature and the second sub-hub feature, respectively.

Further, in this example, based on the determined similarities, the candidate hub images are screened again from the preliminarily screened candidate hub images, and the candidate hub images matching the hub images to be processed are selected.

Figure 18:
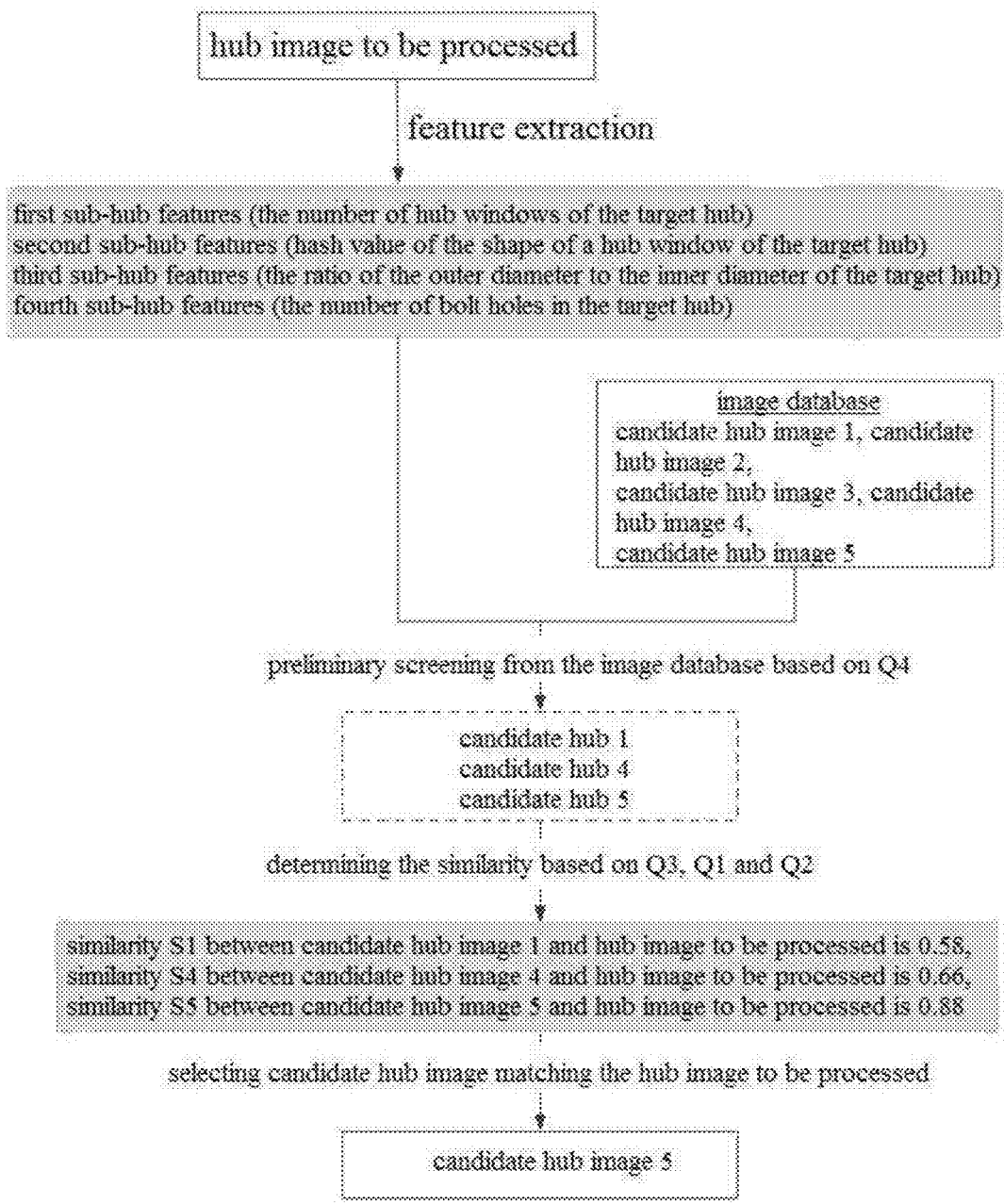
FIG. 18 is an exemplary flowchart of another hub image retrieval provided by the embodiment of the present application.

Referring to FIG. 18, an exemplary diagram of the above-mentioned screening process is provided, in which it is assumed that the image database contains candidate hub images 1 to 5; in this example, the first sub-hub feature, the second sub-hub feature, the third sub-hub feature and the fourth sub-hub feature are respectively extracted for the candidate hub images 1 to 5 in advance and stored in the image database as respective corresponding candidate hub images; furthermore, in this example, the first sub-hub feature Q1, the second sub-hub feature Q2, the third sub-hub feature Q3 and the fourth sub-hub feature Q4 may be extracted for the hub image to be processed, and then preliminary screening is carried out from the image database based on Q4 to screen out the candidate hub image 1, the candidate hub image 4 and the candidate hub image 5; the similarity is further determined based on Q3, Q1 and Q2. Here, as illustrated in the figure, the similarity S1 between the candidate hub image 1 and the hub image to be processed is 0.58, the similarity S4 between the candidate hub image 4 and the hub image to be processed is 0.66, and the similarity S5 between the candidate hub image 5 and the hub image to be processed is 0.88, then it may select, but not limited to, the candidate hub image 5 as a candidate hub image matching the hub image to be processed.

Example 3

Referring to Examples 1 and 2 above, the following procedure is performed after extracting the first sub-hub feature to the fourth sub-hub feature of the hub image to be processed:

taking the first sub-hub feature as the basic sub-hub feature in the retrieval, a candidate hub image similar to the hub image to be processed is preliminarily screened out from the image database; further based on the third sub-hub feature, the fourth sub-hub feature and the second sub-hub feature of the hub image to be processed, determining the similarity of each candidate hub image preliminarily screened out and the hub image to be processed; in this example, the above similarity satisfies the following formula (8)

$$Si = k1 \times P3_i + k2 \times P4_i + (1-k1-k2) \times P2_i \quad \text{Formula (8)}$$

wherein, formula (8), i is the identification of each candidate hub image screened out for the first time; Si is the similarity between the candidate hub image identified as i and the hub image to be processed; $P3_i$ is a sub-similarity between the third sub-hub feature of the candidate hub image identified as i and the third sub-hub feature of the hub image to be processed; $P4_i$ is a sub-similarity between the fourth sub-hub feature of the candidate hub image identified as i and the fourth sub-hub feature of the hub image to be processed; $P2_i$ is a sub-similarity between the second sub-hub feature of the candidate hub image identified as i and the second sub-hub feature of the hub image to be processed; k1, k2 and (1−k1−k2) are weights corresponding to the third sub-hub feature, the fourth sub-hub feature and the second sub-hub feature, respectively.

Further, in this example, based on the determined similarities, the candidate hub images are screened again from the preliminarily screened candidate hub images, and the candidate hub images matching the hub images to be processed are selected.

Figure 19:
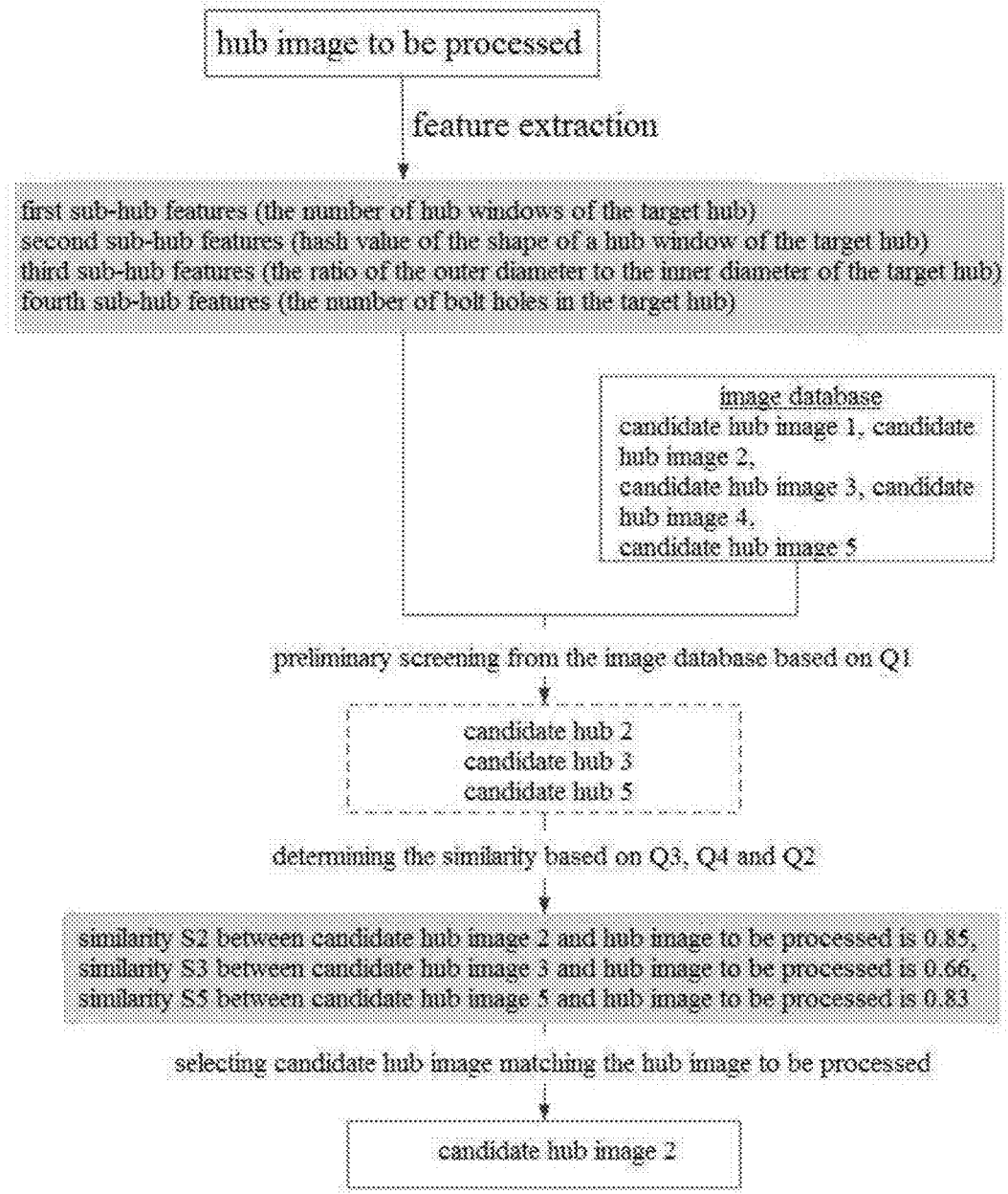
FIG. 19 is an exemplary flowchart of another hub image retrieval provided by the embodiment of the present application

Referring to FIG. 19, an exemplary diagram of the above-mentioned screening process is provided, in which it is assumed that the image database contains candidate hub images 1 to 5; in this example, the first sub-hub feature, the second sub-hub feature, the third sub-hub feature and the fourth sub-hub feature are respectively extracted for the candidate hub images 1 to 5 in advance and stored in the image database as respective corresponding candidate hub images; furthermore, in this example, the first sub-hub feature Q1, the second sub-hub feature Q2, the third sub-hub feature Q3 and the fourth sub-hub feature Q4 may be extracted for the hub image to be processed, and then preliminary screening is carried out from the image database based on Q1 to screen out the candidate hub image 2, the candidate hub image 3 and the candidate hub image 5; the similarity is further determined based on Q3, Q4 and Q2. Here, as illustrated in the figure, the similarity S2 between the candidate hub image 2 and the hub image to be processed is 0.85, the similarity S3 between the candidate hub image 3 and the hub image to be processed is 0.66, and the similarity S5 between the candidate hub image 5 and the hub image to be processed is 0.83, then it may select, but not limited to, the candidate hub image 2 as a candidate hub image matching the hub image to be processed.

The following provide several application scenarios of the above hub image retrieval methods:

Application Scenario 1: When designing hub, it is needed to retrieve whether a similar hub exists in the project library. Firstly, the schematic diagram of the A-plane model of the hub is extracted as the hub image to be processed. Through the above process analysis, at least one sub-hub feature is extracted from the hub image to be processed, and the extracted sub-hub feature is determined as the hub feature of the hub image to be processed. Then, based on the above method, the hub models corresponding to each candidate hub image in the image database are compared and analyzed one by one to obtain similarity. Finally the similarity is sorted from large to small, and the hub models corresponding to the top 10 candidate hub images with the highest similarity are provided to users for reference and selection.

Application Scenario 2: In the bracket system, there is a bulk of historical data needed to be stored in the image database. Firstly, the schematic diagram of the historical bracket is extracted. Through the above process analysis, an image containing a bracket is determined as a candidate bracket image. Through a similar method to the feature extraction process of the hub image, the important features of each historical bracket image (such as the number of holes of the bracket, the type of the bracket, etc.) are extracted, and the extracted feature information is imported into the image database for bracket, so as to carry out image retrieval for the bracket image to be processed including the target bracket.

Application Scenario 3: In other production apparatus, the method in the embodiment of the present application is used to retrieve or screen hub photos/images/pictures, etc.

Figure 20:
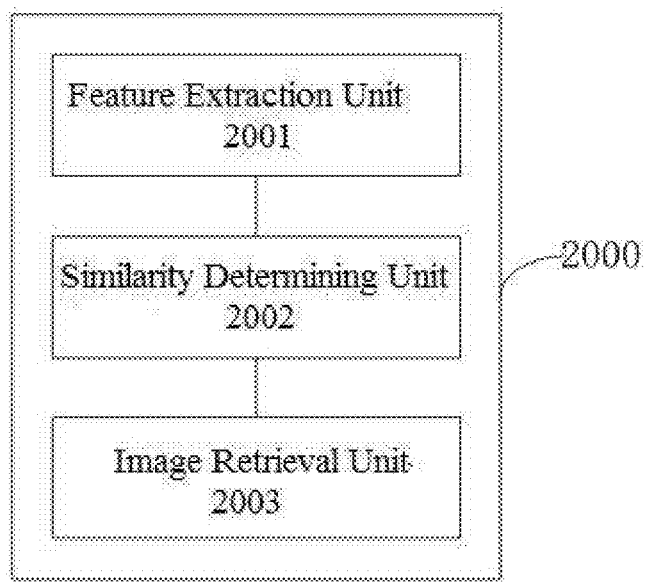
FIG. 20 is a structural diagram of a hub image retrieval device provided by the embodiment of the present application.

As shown in FIG. 20, based on the same inventive concept, an embodiment of the present application provides a hub image retrieval device 2000, comprising:

Feature Extraction Unit 2001, performing feature extraction on a hub image to be processed containing a target hub, and obtaining a hub feature to be processed containing N sub-hub features, wherein the N sub-hub features at least include information characterizing the features of a hub window of the target hub, N is an integer greater than zero;

Similarity Determining Unit 2002, determining similarities between candidate hub features of each candidate hub image and the hub features to be processed;

Image Retrieval Unit 2003, selecting a candidate hub image matching the hub image to be processed from the plurality of candidate hub images based on the determined respective similarities.

As one embodiment, the sub-hub feature comprises at least one of the following: a first sub-hub feature characterizing a number of hub windows of the target hub in the hub image to be processed; a second sub-hub feature characterizing a shape of a hub window of the target hub in the hub image to be processed.

As one embodiment, the sub-hub feature further includes at least one of the following: a third sub-hub feature characterizing hub size information of the target hub in the hub image to be processed; a fourth sub-hub feature characterizing information on the number of bolt holes in the target hub in the hub image to be processed.

As an embodiment, when the hub feature to be processed includes the third sub-hub feature, the feature extraction unit 2001 is further used for:
  determining the center point of the target hub in the image to be processed; extracting the outer radius and inner radius of the target hub based on the center point; based on the outer radius and the inner radius, the third sub-hub feature is determined.

As one embodiment, the Similarity Determining Unit 2002 is specifically used for:
  respectively taking each candidate hub feature as a current candidate hub feature and executing a similarity determination operation; wherein, the similarity determination operation includes:
  carrying out N target operations respectively according to the current candidate hub features, and determining N sub-similarities corresponding to the current candidate hub features; a target action includes: determining a sub-hub feature of the N sub-hub features as a target sub-hub feature, and determining the similarity between the target sub-hub feature contained in the current candidate hub feature and the target sub-hub feature contained in the hub feature to be processed as a sub-similarity corresponding to the current candidate hub feature; wherein, the features of the target sub-hubs in different target operations are different;
  determining the similarity between the current candidate hub features and the hub features to be processed based on N sub-similarities corresponding to the current candidate hub features.

As one embodiment, the Similarity Determining Unit 2002 is specifically used for:
  carrying out weighted sum on the N sub-similarities according to the respective corresponding weights of the N sub-hub features to obtain the similarity of the current candidate hub features and the hub features to be processed; or
  determining the number of sub-similarities larger than the corresponding first similarity threshold among the N sub-similarities as the similarity between the current candidate hub feature and the hub feature to be processed.

As one embodiment, the Image Retrieval Unit 2003 is specifically used for:
  determining a similarity greater than a second similarity threshold among the respective similarities as a target similarity or determining a maximum similarity among the respective similarities as the target similarity;

determining the candidate hub image corresponding to the target similarity as a candidate hub image matching the hub image to be processed.

As an embodiment, when the sub-hub feature includes the second sub-hub feature, the feature extraction unit 2001 is specifically used for: extracting a first hash of each hub window of the target hub in the hub image to be processed; determining a hub window array of the target hub based on each extracted first hash; wherein the determined hub window array comprises a single window array or a multi-window array; a second hash of the hub window array is determined as the second sub-hub feature.

As an embodiment, the Nis an integer greater than 1, and the priority of different sub-hub features in the N sub-hub features is different, and the similarity determination unit 2002 is further used for:

based on the features of the basic sub-hub, a part of the candidate hub images is screened out from the plurality of candidate hub images; the similarity between the candidate hub feature of each candidate hub image in the partial candidate hub image and the hub feature to be processed is determined.

As one embodiment, the Hub Image Retrieval Apparatus 2000 in FIG. 20 may be used to implement any of the hub image retrieval methods previously discussed.

Figure 21:
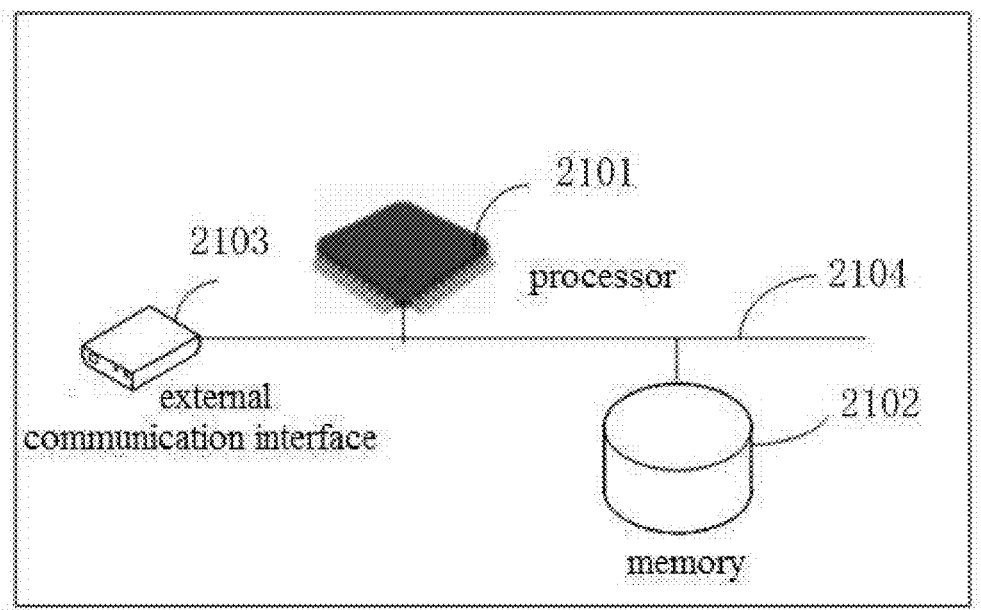
FIG. 21 is a structural diagram of a computer device provided by an embodiment of the present application.

The Hub Image Retrieval Device 2000 is an embodiment of a hardware entity, such as the computer device shown in FIG. 21, which includes a processor 2101, a memory 2102 and at least one external communication interface 2103; The processor 2101, the memory 2102 and the external communication interface 2103 are all connected through a bus 2104.

A computer program is stored in the memory 2102;

The processor 2101 implements the position fingerprint positioning method discussed above when executing the computer program.

One processor 2101 is taken as an example in FIG. 21, however, the number of processors 2101 is not actually limited.

The memory 2102 may be a volatile memory such as a random-access memory (RAM); The memory 2102 may also be a non-volatile memory, such as a read-only memory, a flash memory, a hard disk drive (HDD) or a solid-state drive (SSD), or any other memory capable of carrying or storing desired program code in the form of instructions or data structures and accessible by a computer, but not limited thereto. The memory 2102 may be a combination of the above memory.

Based on the same technical concept, embodiments of the present application also provide a computer-readable storage medium that stores computer instructions that, when run on a computer, cause the computer to perform a positional fingerprint positioning method as previously discussed.

The invention claimed is:

1. A hub image retrieval method, comprising:
performing feature extraction on hub image to be processed containing a target hub, and obtaining a hub feature to be processed containing N sub-hub features, wherein the N sub-hub features at least include information characterizing the features of a hub window of the target hub, N is an integer greater than zero;
determining similarities between candidate hub features of each candidate hub image in a plurality of candidate hub images and the hub features to be processed;
selecting a candidate hub image matching the hub image to be processed from the plurality of candidate hub images based on the determined respective similarities;
wherein the sub-hub feature comprises a second sub-hub feature characterizing a shape of a hub window of the target hub in the hub image to be processed;
wherein when the sub-hub feature comprises the second sub-hub feature, in the process of performing feature extraction on a hub image to be processed containing a target hub and obtaining a hub feature to be processed containing N sub-hub features comprises:
extracting a first hash of each hub window of the target hub in the hub image to be processed;
determining a hub window array of the target hub based on each extracted first hash; wherein the determined hub window array comprises a single window array or a multi-window array; and
determining a second hash of the hub window array as the second sub-hub feature.

2. The method of claim 1, wherein the sub-hub feature further comprises:
a first sub-hub feature characterizing a number of hub windows of the target hub in the hub image to be processed.

3. The method of claim 1, wherein the sub-hub feature further comprises at least one of:
a third sub-hub feature characterizing hub size information of the target hub in the hub image to be processed;
a fourth sub-hub feature characterizing information of the number of bolt holes in the target hub in the hub image to be processed.

4. The method of claim 3, wherein when the hub feature to be processed comprises the third sub-hub feature,
the performing feature extraction on a hub image to be processed containing a target hub, and obtaining a hub feature to be processed further comprises:
determining a center point of the target hub in the image to be processed;
extracting an outer radius and an inner radius of the target hub based on the center point;
determining the third sub-hub feature based on the outer radius and the inner radius.

5. The method of claim 1, wherein determining similarities between candidate hub features of each candidate hub image and the hub features to be processed comprises:
respectively taking each candidate hub feature as a current candidate hub feature and executing a similarity determination operation; wherein, the similarity determination operation includes:
respectively carrying out N target operations on the current candidate hub features, and determining N sub-similarities corresponding to the current candidate hub features; a target operation includes: determining a sub-hub feature of the N sub-hub features as a target sub-hub feature, and determining the similarity between the target sub-hub feature contained in the current candidate hub feature and the target sub-hub feature contained in the hub feature to be processed as a sub-similarity corresponding to the current candidate hub feature; wherein, the features of the target sub-hubs in different target operations are different;
determining a similarity between the current candidate hub features and the hub features to be processed based on N sub-similarities corresponding to the current candidate hub features.

6. The method according to claim 5, wherein determining a similarity between the current candidate hub features and the hub features to be processed based on N sub-similarities corresponding to the current candidate hub features comprises:
    carrying out weighted summation on the N sub-similarities according to the respective corresponding weights of the N sub-hub features to obtain a similarity between the current candidate hub features and the hub features to be processed; or
    determining the number of sub-similarities larger than a first similarity threshold in the N sub-similarities as the similarity between the current candidate hub feature and the hub feature to be processed.

7. The method of claim 1, wherein selecting a candidate hub image matching the hub image to be processed from the plurality of candidate hub images based on the determined respective similarities comprises:
    determining a similarity greater than a second similarity threshold in each similarity as a target similarity, or determining a maximum similarity degree in each similarity as the target similarity;
    determining the candidate hub image corresponding to the target similarity as a candidate hub image matching the hub image to be processed.

8. The method of claim 1, wherein the N is an integer greater than 1, and the priority of different sub-hub features in the N sub-hub features is different, and before determining similarities between candidate hub features of each candidate hub image in a plurality of candidate hub images and the hub features to be processed, further comprises:
    selecting at least one of N sub-hub features included in the hub feature to be processed as a basic sub-hub feature based on the priority of different sub-hub features;
    screening out a part of the candidate hub images from the plurality of candidate hub images based on the basic sub-hub feature;
    the determining similarities between candidate hub features of each candidate hub image in a plurality of candidate hub images and the hub features to be processed comprises:
    determining a similarity between a candidate hub feature of each candidate hub image in the plurality of candidate hub images and the hub feature to be processed.

9. A computer device, comprising a memory, a processor, and a computer program stored in the memory and operable on the processor, wherein the processor implements the steps of the method according to claim 1 when executing the program.

10. A computer device, comprising a memory, a processor, and a computer program stored in the memory and operable on the processor, wherein the processor implements the steps of the method according to claim 2 when executing the program.

11. A computer device, comprising a memory, a processor, and a computer program stored in the memory and operable on the processor, wherein the processor implements the steps of the method according to claim 3 when executing the program.

12. A computer device, comprising a memory, a processor, and a computer program stored in the memory and operable on the processor, wherein the processor implements the steps of the method according to claim 4 when executing the program.

13. A computer device, comprising a memory, a processor, and a computer program stored in the memory and operable on the processor, wherein the processor implements the steps of the method according to claim 5 when executing the program.

14. A computer device, comprising a memory, a processor, and a computer program stored in the memory and operable on the processor, wherein the processor implements the steps of the method according to claim 6 when executing the program.

15. A computer device, comprising a memory, a processor, and a computer program stored in the memory and operable on the processor, wherein the processor implements the steps of the method according to claim 7 when executing the program.

16. A computer device, comprising a memory, a processor, and a computer program stored in the memory and operable on the processor, wherein the processor implements the steps of the method according to claim 8 when executing the program.

* * * * *